(12) United States Patent
Macchietto et al.

(10) Patent No.: US 9,593,828 B2
(45) Date of Patent: Mar. 14, 2017

(54) METHOD AND APPARATUS FOR DAMPING VIBRATION OF POLES

(71) Applicant: Valmont Industries, Inc., Omaha, NE (US)

(72) Inventors: Carl J. Macchietto, Omaha, NE (US); Richard Christenson, Mansfield Center, CT (US)

(73) Assignee: Valmont Industries, Inc., Omaha, NE (US)

( * ) Notice: Subject to any disclaimer, the term of this patent is extended or adjusted under 35 U.S.C. 154(b) by 10 days.

(21) Appl. No.: 14/708,075

(22) Filed: May 8, 2015

(65) Prior Publication Data

US 2015/0354791 A1      Dec. 10, 2015

Related U.S. Application Data

(60) Provisional application No. 61/991,307, filed on May 9, 2014.

(51) Int. Cl.
| | |
|---|---|
| *F16F 7/10* | (2006.01) |
| *F21V 15/04* | (2006.01) |
| *F16F 15/023* | (2006.01) |
| *F16F 15/03* | (2006.01) |

(52) U.S. Cl.
CPC ............... *F21V 15/04* (2013.01); *F16F 7/10* (2013.01); *F16F 15/023* (2013.01); *F16F 15/03* (2013.01)

(58) Field of Classification Search
CPC . F16F 7/10; F16F 15/02; F16F 15/023; F21V 15/04; H02G 7/14; H02G 7/05; Y02E 10/722

USPC .................... 188/267, 378, 379, 67; 362/369
See application file for complete search history.

(56) References Cited

U.S. PATENT DOCUMENTS

| | | | | |
|---|---|---|---|---|
| 3,911,199 | A * | 10/1975 | Fischer ..................... | F16F 7/10 174/42 |
| 5,724,862 | A * | 3/1998 | Hannah ................... | D06F 7/225 74/570.2 |
| 5,896,961 | A * | 4/1999 | Aida ........................ | F16F 6/00 188/267 |
| 7,232,017 | B2 * | 6/2007 | Minor ..................... | F16F 7/015 174/42 |
| 7,871,186 | B2 * | 1/2011 | Minor ..................... | F21V 15/04 362/369 |
| 9,121,466 | B2 * | 9/2015 | Tsugihashi .............. | F16F 7/015 |
| 2007/0012530 | A1 * | 1/2007 | Garcia .................... | F16C 27/04 188/268 |
| 2015/0323033 | A1 * | 11/2015 | Macchietto ............. | F16F 15/02 188/378 |

FOREIGN PATENT DOCUMENTS

CN           103557266      *   2/2014   ............. F16F 15/02

* cited by examiner

*Primary Examiner* — Christopher Schwartz
(74) *Attorney, Agent, or Firm* — Milligan PC LLO

(57) ABSTRACT

A method and apparatus for providing effective damping of first mode vibration for a range of different types of poles is disclosed. According to a preferred embodiment, the apparatus includes a housing having a horizontal floor with an inward curved surface to form an enclosed chamber and at least one damping weight disposed in the inward curved surface and adapted to freely roll inside the enclosed chamber. Preferably, the apparatus is mounted on the top end of a pole for damping wind-induced first, second or higher mode vibration of the poles.

1 Claim, 7 Drawing Sheets

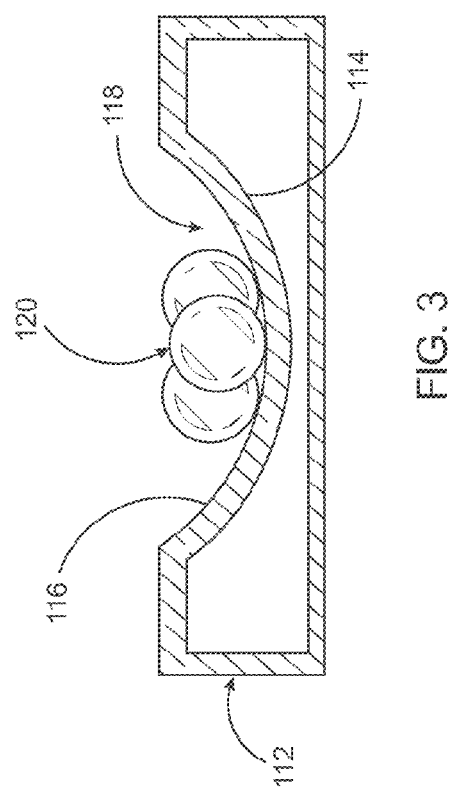
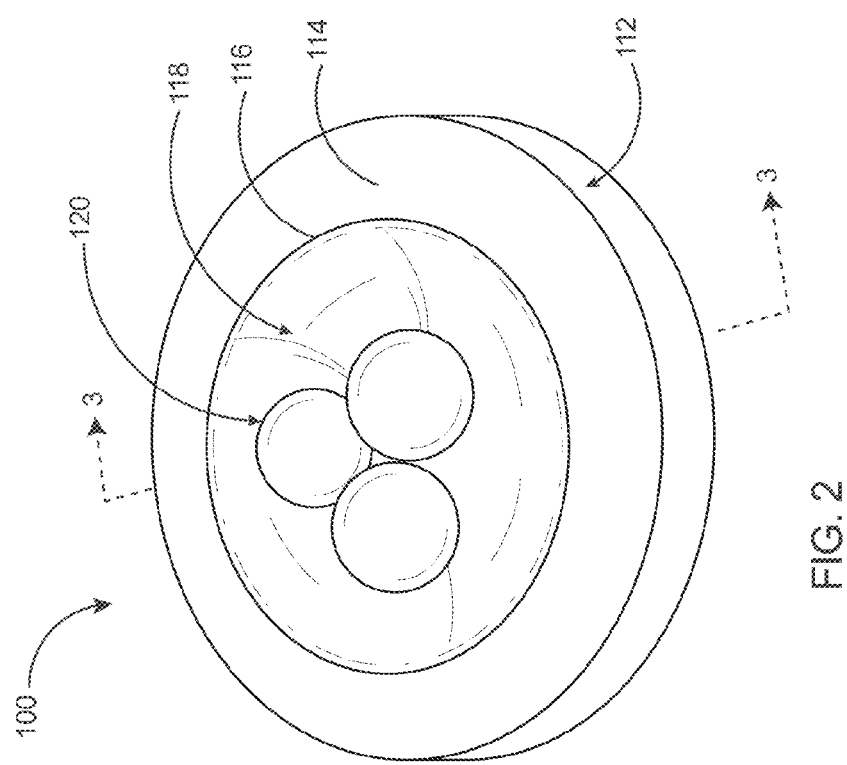

METHOD AND APPARATUS FOR DAMPING VIBRATION OF POLES

RELATED APPLICATIONS

The present application claims priority to U.S. Provisional Application No. 61/991,307 filed May 9, 2014.

FIELD OF INVENTION

The present invention is related in general to vibration damping and, in particular, to a method and apparatus for providing effective damping of first mode, second mode, or higher mode vibrations for a range of different types of poles.

BACKGROUND OF THE INVENTION

Light pole structures are designed to accommodate certain specific environmental, load and aesthetic requirements. Light poles, traffic mast arms and similar structures are subjected to naturally-induced vibrations which cause damages/failures of such structures. Probably the most common vibration problems are created by wind flow over the pole and also wind gusts on facing surfaces which causes vibration of the poles. Traditional lightly-damped structures are flexible and highly susceptible to wind-induced vibration.

Wind gusts can result in excessive vibration. For cantilever mast arm structures this can result in horizontal out-of-plane motion perpendicular to the length of the mast arm. This kind of motion along the length of the mast arm is minimal, resulting in motion predominately in a single direction.

A number of different methods and apparatuses have been suggested to reduce the excessive wind-induced vibration of the poles. One such apparatus includes a pole damping system in which a hollow tubular member is attached to the wall of a hollow pole with an inertia mass in the form of a solid rod on the interior of the tube, which is unattached to the tube for limiting movement on the interior of the tube for damping vibrations of the pole. In another apparatus, the tubular member is mounted on the exterior of the pole. For each of these types of systems, the vibration dampening occurs only at the midpoint of the pole and mainly for a second mode of vibration. Accordingly, these systems are ineffective at dampening vibrations to a broad range of excitation intensities and when operational can result in loud noises.

Additional prior art further includes a pole vibration damping system having an annular housing with an internal radial pole encircling chambers. In this system, lead spheres are provided for effecting damping of first mode harmonic vibrations with the assembly being attached to the upper end portion of the pole and operating in conjunction with a pole vibration damping device mounted medially for damping second harmonic mode vibrations. The downside to this alternative system is that it provides a flat floor that is only effective when the amplitude is large enough that the moving mass hits the walls of the pole vibration damping device and the energy dissipation is achieved through repeated impacts. Such pole vibration damping systems do not provide effective dampening for small amplitudes and can result in loud noises.

Based on the foregoing, there is a need for a method and apparatus for providing effective damping of various modes of vibrations for a range of different types of poles. Such a needed device would provide effective dampening to a broad range of excitation intensities. The device would be effective for both small and large amplitudes and act as a vibration absorber. Further, the method and apparatus would dissipate energy through friction of damping weights, pneumatic damping, viscous damping and/or through eddy current dampening. Finally, the method and apparatus would be relatively quiet in operation. The present invention overcomes prior art shortcomings by accomplishing these critical objectives.

SUMMARY OF THE DISCLOSURE

To minimize the limitations found in the prior art, and to minimize other limitations that will be apparent upon the reading of the specifications, the preferred embodiment of the present invention provides a method and apparatus for providing effective damping of vibration for a range of different types of poles.

According to a first preferred embodiment, the present invention discloses an apparatus for damping vibration of a pole. The apparatus preferably includes a housing with a horizontal floor having an inward curved surface for achieving vibration attenuation at a middle portion thereof to form an enclosed chamber. According to a further aspect of the first embodiment, at least one damping weight (also referred to throughout as a "weight pack") is preferably disposed in the inward curved surface and is preferably substantially spherical in shape. According to an alternative preferred embodiment, the damping weight may alternatively be substantially non-spherical in shape. Preferably, the damping weights are disposed for free movement along the inward curved surface inside the enclosed chamber. The damping weight(s) preferably has an arcuate diameter so that the damping weight(s) can move on the surface of the inward curved surface for achieving vibration attenuation. The damping weight(s) preferably may translate at a set period of oscillation, which can be set by the curvature of the inward curved surface, so that the apparatus can act as a vibration absorber which is effective at both small and large amplitudes.

According to a further preferred embodiment, the inward curved surface of the present invention may be made by casting an aluminum part as the horizontal floor of the enclosed chamber or it may be made using any conventional method of manufacture. The damping of the vibration may preferably be achieved through friction of the damping weights moving across the inward curved surface, friction from the damping weights in contact with one another as they translate in the inward curved surface, pneumatic damping or by eddy currents created by the movement of the damping weights through a magnetic field.

According to a further aspect of the present invention, the apparatus may be mounted to a top end of a pole using at least one mounting means for damping wind-induced, first mode vibration of the pole. Preferably, in the case of damping the first mode vibration of the pole, the apparatus is mounted at the top end of a pole using a mounting apparatus which is in the form of a pipe or clamp of conventional construction and to which a light or other device is conventionally mounted when the pole is in use.

According to a further preferred embodiment, a weight pack can be placed on top of the damping weight(s), acting as bearings, so that the weight pack translates accordingly. The inward curved surface on the horizontal floor of the chamber, in one embodiment, has a matching or dissimilar curved surface on the bottom side of the weight pack to insure the weight pack remains centered in the chamber.

According to one embodiment of the present invention for addressing the wind gust affecting the cantilever mast arm structures resulting in horizontal out-of-plane motion perpendicular to the length of the mast arm, the damper can be simplified by allowing motion of the damping mass(es) only in a single direction. This can be achieved by using curved tracks in which the dampening weights travel in specifically tracked directions.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and to improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

FIG. 2 is a top perspective view of the apparatus of FIG. 1 with damping weights placed on the inward curved surface.

FIG. 3 is a cross-sectional view taken along lines 3-3 in FIG. 2.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
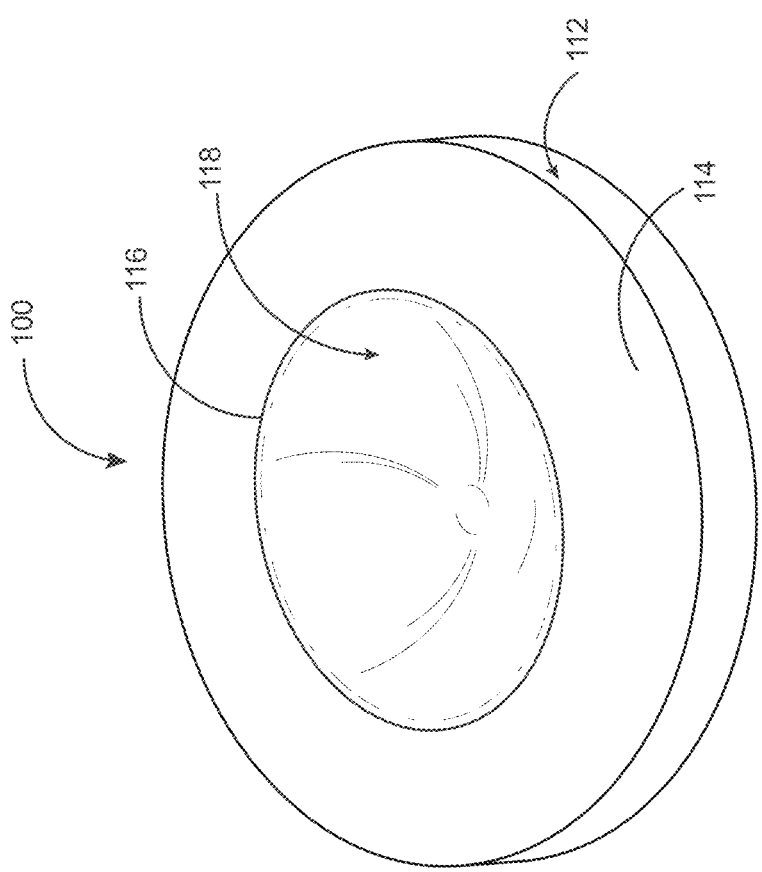
FIG. 1 is a top perspective view of an apparatus for damping vibration of a pole with an enclosed chamber having an inward curved surface.

FIGS. 1 and 2 illustrate top perspective views of an apparatus for damping vibration of a pole in accordance with a first preferred embodiment of the present invention. As shown, the apparatus 100 includes a housing 112 and a horizontal floor 114 having an inward curved surface 116 at a middle portion thereof to form an enclosed concave area 118. As shown in FIG. 2, at least one damping weight 120 is preferably disposed in the inward curved surface 116. Preferably, the damping weight 120 is substantially spherical in shape. Although the apparatus 100 is shown in FIG. 2 holding three damping weights 120, the apparatus 100 may alternatively hold various numbers of damping weights. Preferably, the damping weights 120 are disposed for free rolling movement along the inward curved surface 116 inside the enclosed concave area 118. According to a further preferred embodiment, the damping weight(s) are preferably sized so that the damping weight 120 can move on the surface of the inward curved surface 116 to achieve a period of oscillation as a vibration absorber. Preferably, the damping weights 120 may translate at a set period of oscillation, which can be set by the curvature of the inward curved surface 116, so that the apparatus 100 can act as a vibration absorber. According to alternative embodiments, the radius of the inward curved surface 116 can be varied. Further, the inward curved surface 116 can be made in any conventional way, including by casting an aluminum part as the horizontal floor 114 of the enclosed concave 118.

According to a further preferred embodiment, the apparatus 100 may be mounted to a top end of a light pole 112 using at least one mounting element for damping wind-induced first mode vibration of the light pole. Preferably, in the case of damping the first mode vibration of the light pole, the apparatus 100 is mounted at the top end of the light pole with a mounting element. The mounting element may preferably be in the form of a pipe or clamp of conventional construction and to which a light or other device is conventionally mounted when the light pole is in use.

For each embodiment of the present invention, the damping of the vibration can be of the form of friction of the damping weights 120 moving across the inward curved surface 116, friction from the damping weights 120 in contact with one another as they translate in the inward curved surface 116, pneumatic damping and/or eddy current dampening created by the damping weights 120 moving through a magnetic field. In one aspect of the present invention, the apparatus 100 mounted at other heights of the pole is capable of reducing second mode natural frequency vibrations. In a further aspect of the present invention, the apparatus 100 mounted at other heights of the pole is capable of reducing higher mode natural frequency vibrations.

With reference now to FIG. 3, according to a further preferred embodiment, the enclosed concave area 118 is preferably circular in shape. According to alternative embodiments, the enclosed concave area 118 may alternatively be non-circular in shape as well. Fully assembled, the enclosed concave area 118 is preferably closed at its top by at least one covering element 208 (shown in FIG. 4) and the enclosure is sealed and positioned so that the damping weight(s) 120 may roll independently and freely along the inward curved surface 116 within the enclosed concave area 118. Preferably, the selected damping weight(s) 120 are chosen to provide enough mass to adequately dampen the vibration of the pole.

According to an alternative embodiment, the damping of the vibrations may be assisted by filling the inward curved surface 116 with fluid so that the damping weights 120 travel through the fluid in response to vibrations.

In one aspect of the present invention, the apparatus 100 mounted at the top end of the pole is capable of reducing first mode natural frequency vibrations. In yet another aspect of the present invention, the apparatus 100 is effective at an end of a traffic mast arm to mitigate out of plane first mode vibrations (back and forth movement). In another aspect of the present invention, the apparatus 100 dampens the first mode vibration provided in the top end of the pole in conjunction with a second mode vibration provided in a mid-portion of the pole so as to reduce vibration and prevent structural failure caused by either first or second mode vibration. For each configuration, the apparatus 100 is preferably configured to reduce naturally-induced vibrations (wind induced vibrations) by attachment to a variety of support structures including at least one of a slender structure, pole support system holding or supporting lighting, traffic signal, street sign, signage, or other devices.

Figure 4:
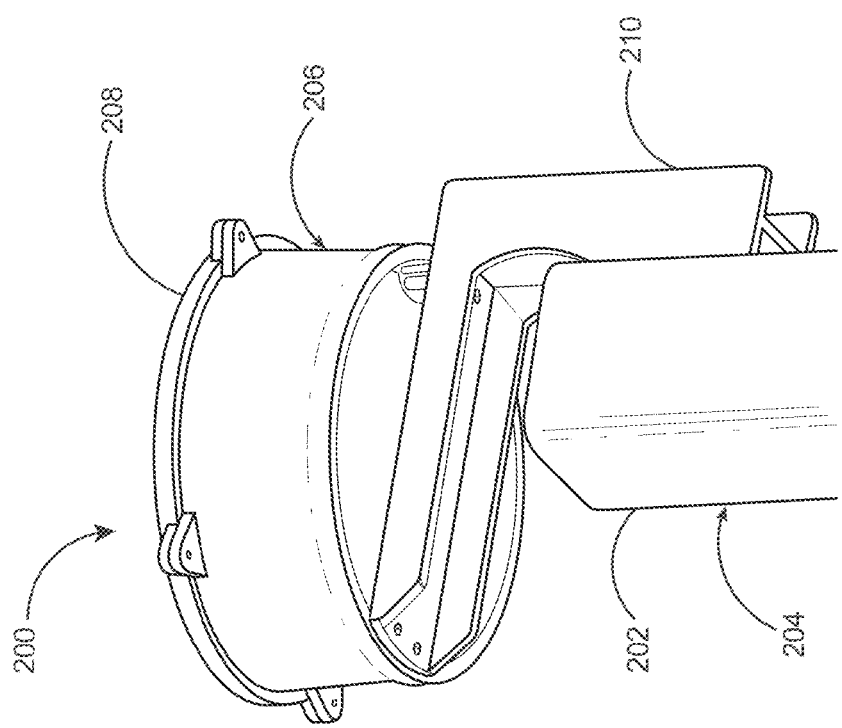
FIG. 4 is an enlarged view of one embodiment of the present invention which is positioned on a light pole.

With reference now to FIG. 4, an enlarged view of one embodiment of the present invention which is positioned on a light pole is illustrated. In this embodiment, an apparatus 200 is preferably placed near the top end 202 of a light pole 204. If the light pole 204 is vibrating in first mode, the top end 202 of the light pole 204 will move back and forth. In this embodiment, the apparatus 200 preferably includes a housing 206 having a horizontal floor and is annular. Further, the horizontal floor preferably has an inward curved surface which forms an enclosed concave area which contains at least one damping weight. The damping weight(s) is preferably adapted to roll independently and freely within the enclosed concave area.

Preferably, the enclosed chamber is sealed with a weather seal 208 that is attached on a peripheral edge of the enclosed chamber. As shown in FIG. 4, the apparatus 200 preferably attaches to the top end 202 of the pole 204 using at least one mounting element 210.

Figure 5:
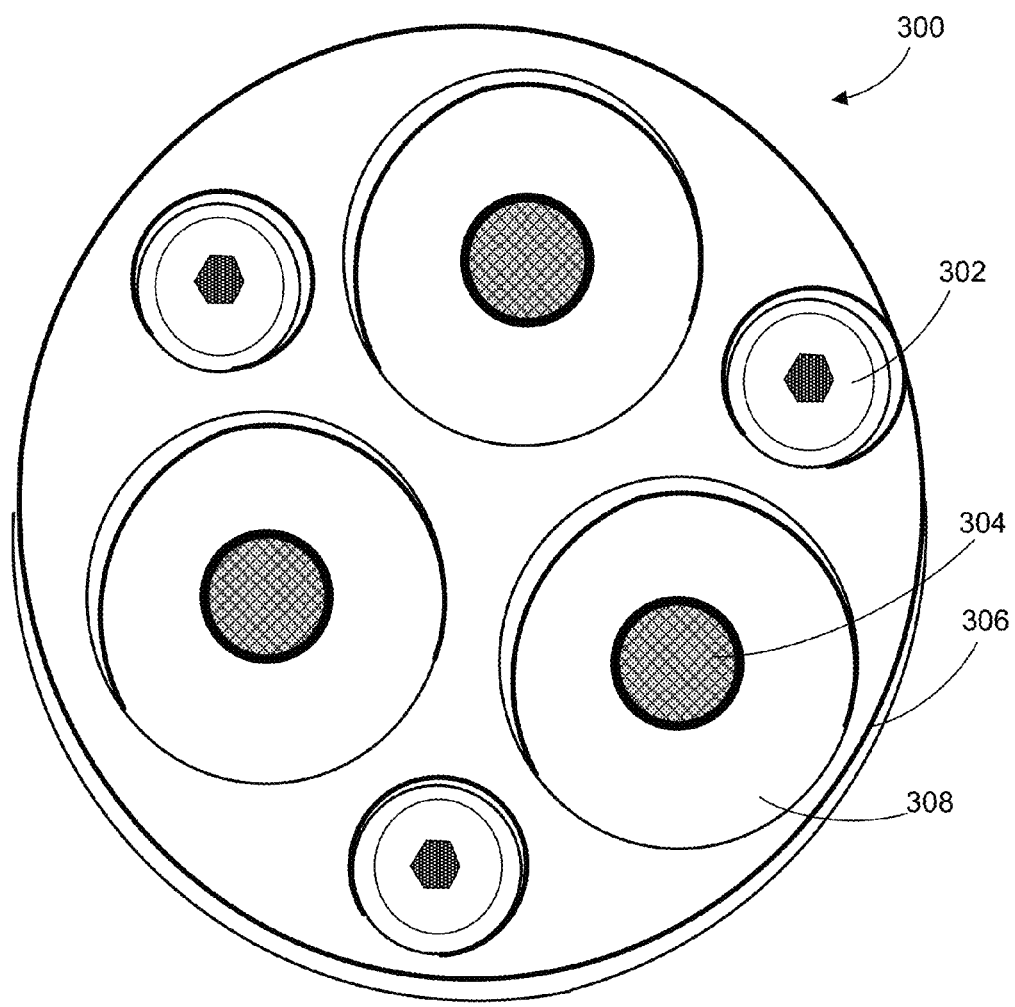
FIG. 5 is a top perspective view of a preferred embodiment of a triple-tray bearing cup plate and three dampening weights.

With reference now to FIG. 5, a top perspective view of a further preferred embodiment of the present invention will now be discussed. As shown in FIG. 5, an alternative embodiment 300 may be used which includes a bearing cup plate 306 containing multiple concave areas 308 which form cups or trays for containing separate bearings 304. In this embodiment, the bearings 304 may act as individual weight packs and/or as traditional bearings as discussed below. Further, although the example tray 306 is shown having three individual concave areas 308 which each contain bearings 304, numerous other ratios and combinations of concave areas 308 and bearings 304 may also be used. For example, a tray may include 1 to 1000 individual concave areas 308. Further, each concave area 308 may hold any number of individual bearings. For example, each concave area 308 may contain 1 to 1000 individual bearings 304. As further shown in FIG. 5, the bearing cup plate 306 may be attached to the bottom of a housing canister or other substrate using one or more screws 302 or other fastening elements.

Figure 6:
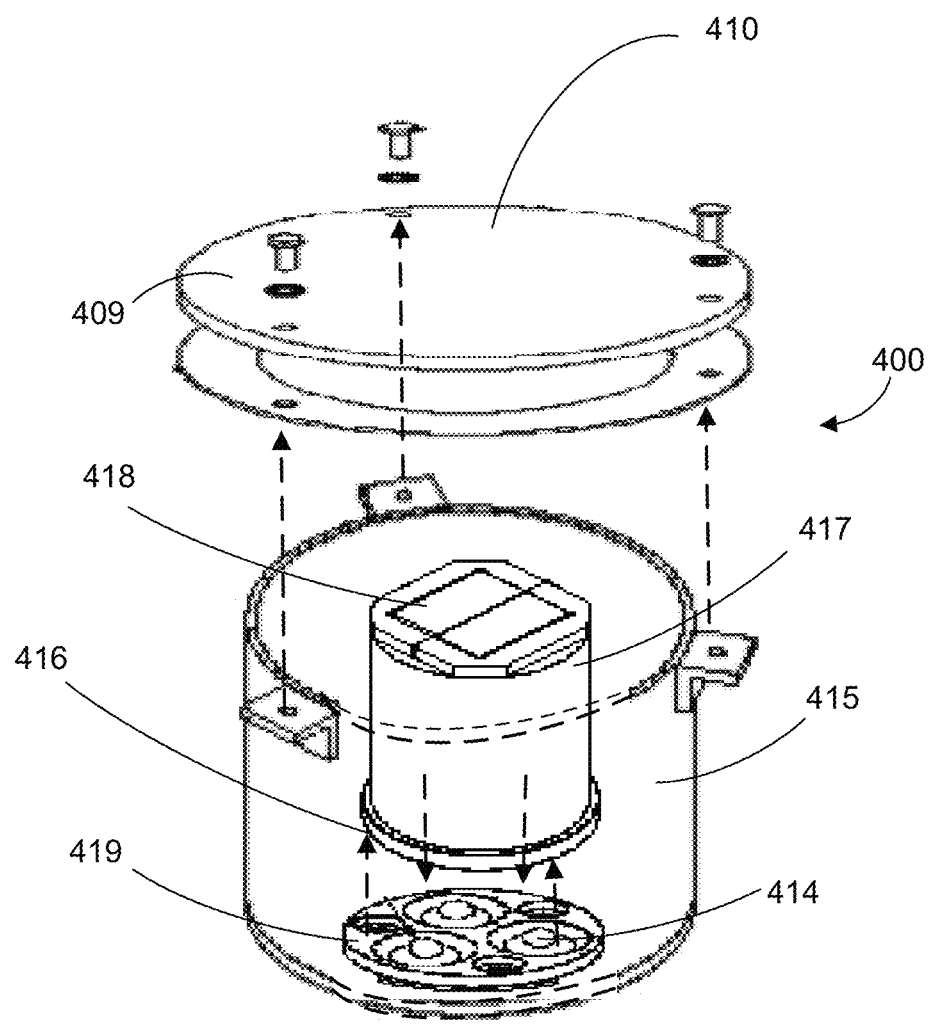
FIG. 6 is a side exploded view of the assembly of one embodiment of the present invention.

With reference now to FIG. 6, an exploded side view of the assembly of one embodiment of the present invention using the alternative embodiment of FIG. 5 will now be discussed. As shown in FIG. 6, a dampening assembly 400 is shown which incorporates bearing cup plates 416 and 419 and bearings 414, which together are positioned within a housing canister 415 below a weight pack 417. In this configuration, the assembly 400 is configured such that the weight pack 417 translates horizontally in any direction on the bearings 414 moving between the two bearing cup plates 416 and 419. As further shown in FIG. 6, lid 410 is positioned above the canister 415 and secured by screw assembly 409.

In one embodiment of this configuration, damping is achieved through the use of eddy currents created by the movement of the weight pack 417 through the magnetic field created by magnet(s) 418 placed at the top of the weight pack 417 moving relative to the lid 410 made of a conductive material. This configuration dissipates the energy of the weight pack 417, resulting in motion dampening of the pole structure. The conducting material of the lid 410 may preferably be made from any non-ferrous metal(s). For example, in one embodiment, the conducting material may include aluminum, copper, gold, silver or a combination thereof. The magnet(s) 418 may include a permanent magnetic material, a ferromagnetic material, or an electromagnet.

In one embodiment, the eddy current dampening device generates electricity, which is sufficient to run an LED light.

Figure 7:
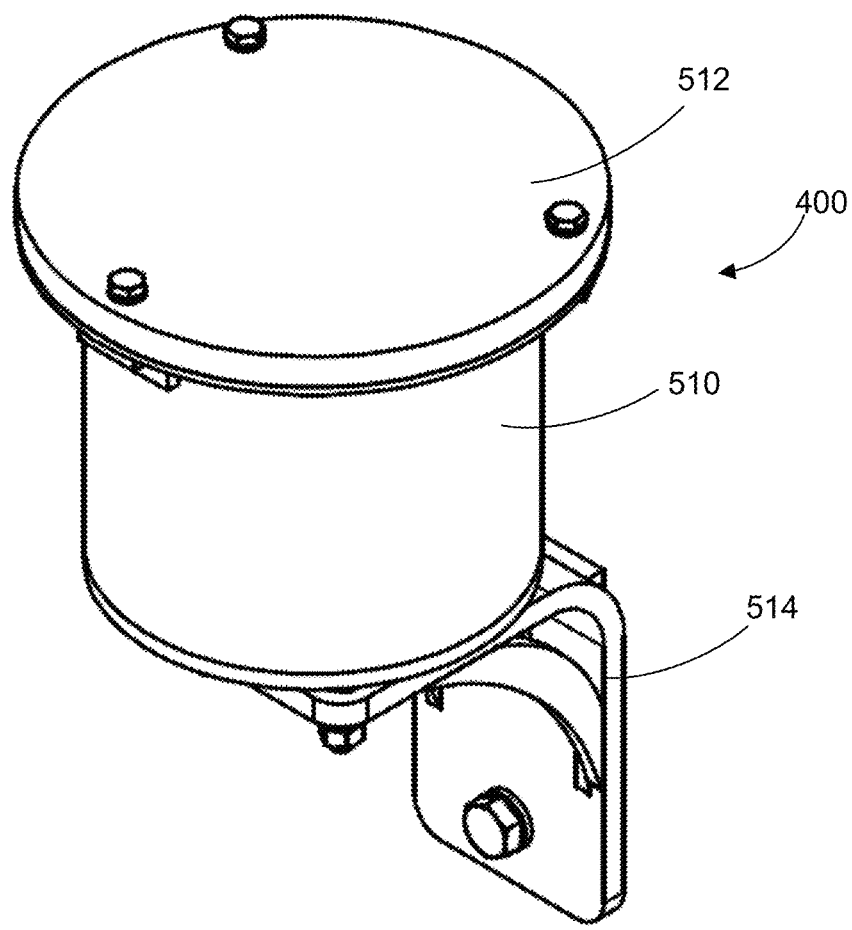
FIG. 7 is an enlarged view of one embodiment of the present invention which is connected to a mount for attachment to a light pole.

With reference now to FIG. 7, a view of the sealed damper assembly 400 of FIG. 6 is shown including a lid 512, a canister 510, and an L-shaped mounted bracket 514 for attachment to a light pole or other cantilever mast arm or substrate. Provisions for leveling the sealed damper assembly 500 by various methods such as leveling adjustment screws attached to the bracket 514 preferably assure that the dampening weight(s) is centered within the housing canister 510.

In accordance with a further preferred embodiment, the damper assembly of the present invention may be constructed to dampen vibrations occurring only in specific directions or planes (referred to as "out of plane damping"). Accordingly, the damper assemble of the present invention may be configured to dampen vibrations occurring in one direction or plane (i.e. side to side or front to back), two directions or planes (i.e. side to side and front to back), or in any number of specific directions or planes (i.e. 3 to 10 different directions and planes). To perform such out of plane damping, the damping assembly may include damping weights which are restricted to oscillate within specifically aligned tracks as shown in FIG. 8 discussed below.

Figure 8:
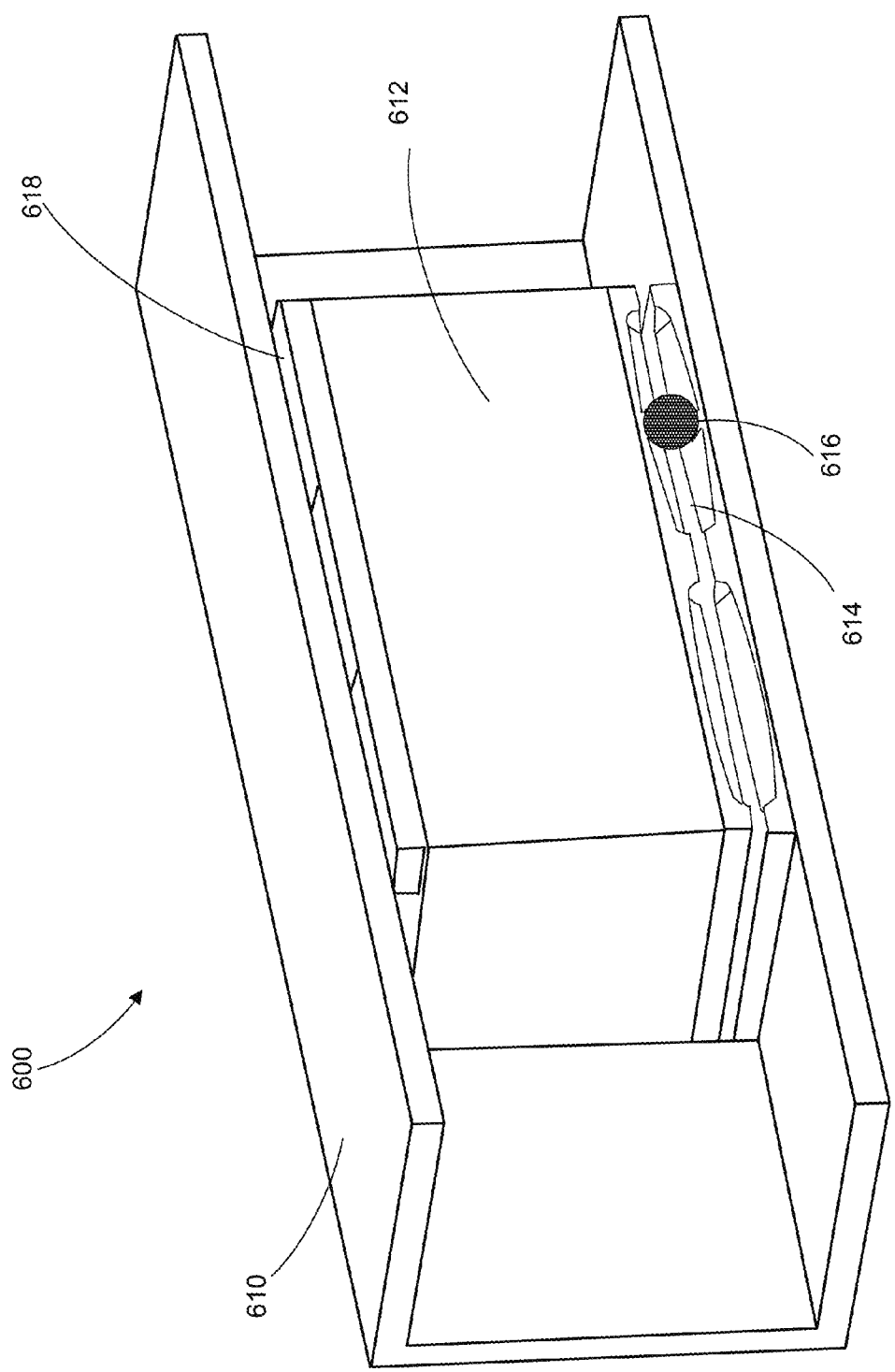
FIG. 8 is a cross-sectional perspective view of an alternative preferred embodiment of a single direction, out-of-plane damper assembly.

With reference now to FIG. 8, a one-directional, out of plane damper assembly 600 is provided. As shown, a bearing 616 is confined within a single groove with a radius providing a curvature along the length of the track 614 so that the weight pack 612 can only move forward and backwards in a single plane. In another embodiment, the bearing(s) can act as the dampening weight(s) with one or more in each groove or track. As further shown, the damper assembly 600 is housed within a casing 610.

In one embodiment of this configuration, damping may be achieved through the use of eddy currents created by the movement of the weight pack 612 through the magnetic field created by magnet(s) 618 placed at the top or sides of the weight pack 612 moving relative to the housing 610 which is preferably made of a conductive material. This configuration dissipates the energy of the weight pack 612, resulting in motion dampening of the pole structure. The conducting material of the housing 610 may preferably be made from any non-ferrous metal(s). For example, in one embodiment, the conducting material may include aluminum, copper, gold, silver or a combination thereof. The magnet(s) 418 may include a permanent magnetic material, a ferromagnetic material, or an electromagnet.

In another embodiment, the conductive housing can be replaced by a conductive rod or bar.

In another embodiment, the eddy current dampening device generates electricity, which is sufficient to run an LED light.

With further reference now to FIG. 8, the damper assembly 600 may preferably be configured to attach to a light pole or other cantilever mast arm or substrate with mounting bracket(s) to mitigate vibrations in one directional plane. Provisions for leveling the damper assembly 600 by various methods such as leveling adjustment screws attached to the bracket preferably assure that the dampening weight(s) or weight pack 612 is centered within the housing 610.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. An apparatus for damping vibration of a pole, the apparatus comprising:
    a housing;
    a horizontal surface within the housing; wherein the horizontal surface further comprises:
        a first inward curved surface, wherein the first inward curved surface forms a first laterally enclosed concave area around a first center point; wherein the first laterally enclosed concave area is comprised of a horizontal wall extending around the first center point;
        further wherein the first laterally enclose concave area is further comprised of lower surface which extends out from the first center point;
        a second inward curved surface, wherein the second inward curved surface is within the same horizontal plane as the first inward curved surface; further wherein the second inward curved surface forms a second laterally enclosed concave area around a second center point; wherein the second laterally enclosed concave area is comprised of a horizontal wall extending around the second center point;
        further wherein the second laterally enclosed concave areas is further comprised of lower surface which extends out from the second center point; and
        a third inward curved surface, wherein the third inward curved surface is within the same horizontal plane as the first inward curved surface and the second inward curved surface; wherein the third inward curved surface forms a third laterally enclosed concave area around a third center point; wherein the third laterally enclosed concave area is comprised of a horizontal wall extending around the third center point;
        further wherein the third laterally enclose concave area is further comprised of lower surface which extends out from the third center point;
    a first dampening weight, wherein the first dampening weight is located within the first enclosed concave area; further wherein the first dampening weight is comprised of a spherical mass which is configured to freely roll within the first enclosed concave area;
    a second dampening weight, wherein the second dampening weight is located within the second enclosed concave area; further wherein the second dampening weight is comprised of a spherical mass which is configured to freely roll within the second enclosed concave area;
    a third dampening weight, wherein the third dampening weight is located within the third enclosed concave area; further wherein the third dampening weight is comprised of a spherical mass which is configured to freely roll within the third enclosed concave area; and
    a lid, wherein the lid is above the horizontal surface;
    further wherein the lid is configured to seal the first dampening weight within the first enclosed concave area;
    further wherein the lid is configured to seal the second dampening weight within the second enclosed concave area;
    further wherein the lid is configured to seal the third dampening weight within the third enclosed concave area;
    wherein the apparatus is configured to be mounted to a top end of the pole for damping wind-induced first mode vibration of the pole.

* * * * *